United States Patent Office 2,770,553
Patented Nov. 13, 1956

2,770,553

SOFT GELATIN ENCAPSULATION

Joseph Francis Weidenheimer, Orangeburg, and Francis Marc Callahan, South Nyack, N. Y., assignors to American Cyanamid Company, New York, N. Y., a corporation of Maine No Drawing. Application September 9, 1952,
Serial No. 308,713

3 Claims. (Cl. 106—136)

This invention relates to improvements in the formulation for the preparation of a mixture to be used for the manufacture of soft gelatin capsules and the soft gelatin capsules thereby manufactured, and particularly to the use of formamide and acetamide as a plasticizer therefor.

In the past, it has been customary to use a formulation consisting essentially of gelatin, glycerin and water. This formulation may additionally contain small quantities of suitable dyes, pigments, odors and molding inhibiting agents, such as the methyl or propyl ester of p-hydroxybenzoic acid. Certain of these may be added to the water and dissolved therein in the formulation of the mixture; and certain of these may be added to a small quantity of alcohol in which they are soluble, which is added to the liquid mix at a suitable stage of manufacture. Such formulations make excellent capsules for some purposes; but, if stored at low temperature, it is found that the capsule shell has a tendency toward brittleness and may break during shipment in the winter or, if stored cold to prevent loss of potency of the contents.

It is an object of this invention to add to the mixture a plasticizing agent, such as formamide, acetamide, lactamide, mannitol, or glycine, or a mixture of more than one of these, and thus prepare a mixture which may be cast in accordance with conventional procedures into a film from which soft gelatin capsules may be manufactured, which capsules will be found to have an increased low temperature resilience and which are more resistant to discoloration or interaction with the capsule's contents than the old formula. The plasticizer from the group consisting of formamide, acetamide, lactamide, mannitol and glycine is substituted for part of the water in the formulation.

It is a further object of this invention to provide a mixture which may be operated on in continuous flow process, and which may be used in an apparatus, providing for the continuous manufacture of the strip, rather than the batchwise manufacture of the strip, although modifications of these latter procedures are not essential to the practice of the manufacture of capsules using our formulation. The quantity of plasticizer required is not large, from 2–6% by weight based on the formulation is normally preferred. Less than 2% is useful, but does not exhibit the full advantages to be obtained from the use of a quantity within our preferred range. Too large a quantity will prevent the film from gelling.

Capsules prepared from this formulation are very useful for storing such materials as dyestuffs or other ingredients which it is desired to have in a sealed stored container suitable for use by dissolving in aqueous solutions or by rupture. Unfortunately, the plasticizers of our invention are somewhat toxic in large quantities and accordingly, are only suitable for use in capsules for human consumption if such capsules are to be used in small quantities.

Various methods may be used to compound our mixture. Two such methods may be referred to as the standard method and the vacuum method. The standard method is essentially a low temperature method, in which chilled water and chilled glycerin are mixed together with the dyes, pigments, odors, preservatives and our plasticizer; and after mixing, thereto is added the gelatin. The order of addition to the liquid is immaterial and, in fact, part of the liquids may be added after the addition of the gelatin, if desired. It is standard practice to perform the mixing at a low temperature, so that the mixture may be thoroughly stirred and become homogeneous before the gelatin absorbs much of the liquid. If a low temperature is not used, an extremely rapid rate of agitation will, to some extent, compensate in that it will insure the homogeneity of the mixture prior to the time when the gelatin will have absorbed the liquid content. It is desirable that a homogeneous mixture be used, as the process is believed, in part, to comprise the hydration of the gelatin and, if the hydration does not occur uniformly, parts of the gelatin may absorb more than a proportionate share of the liquids, and leave particles of solid gelatin, which have not been hydrated. Such particles will interfere with the sealing of capsules formed from the film. If the mixture is thoroughly homogeneous, perfect seals are obtained.

The hydrated mixture may be stored at room temperature or in a chilled room until ready for use. It may be stored longer in a chilled room. When ready for use, the mixture is placed on a steam coil and heated until it becomes fluid. The fluidized mixture is then pumped to a casting mechanism and cast into the gelatin film from which the capsules are formed. It is necessary that a film be cast free from air bubbles. To insure the freedom from air bubbles, it is possible either to accomplish the melting under a vacuum, so that no appreciable quantity of air is present, or to allow the mixture to stand liquid for such a period of time that any trapped air incorporated therein has an opportunity to rise to the surface, whence the bubbles may be separated. It is preferable to use an evacuated kettle for the melting, so that no bubbles are trapped and it is accordingly possible to use the formulation immediately.

Alternatively, the vacuum method of preparation of the mixture takes place in a powerful mixer of the type known as a Sigma-Arm Mixer, or its equivalent. In such a mixer, it is possible to incorporate the liquids, and then add the solids, or vice versa, and it is possible, by using a powerful and rapid agitation, to mix the materials at room temperature and, by withdrawing air before there is an appreciable hydration of the gelatin, to heat at the same time the formulation is mixed and thereby form an air free molten gelatin casting mass immediately. This latter method permits more rapid operation of the capsuling procedure, because the formulation can be prepared as used and storage problems are avoided.

The compositions may vary in proportions, depending upon the use to which they are placed. A more highly plasticized film is normally used for oil filled capsules than for powder filled capsules. Some powders are extremely sensitive to moisture and a low moisture content must be used. If the materials in the capsule tend to interact with the gelatin of the film, we coat the inside of the capsule at the time of manufacture with an agent, such as gum benzoin, which will prevent the interaction between the capsule contents and the gelatin film. Such a layer will also protect the contents to some extent from transient moisture.

Proportions for the composition which are satisfactory are within the range of glycerin 12–18 parts, gelatin 48–56 parts, plasticizer 2–6 parts and water 30–34 parts. In addition thereto, there may be present a minor fraction of a suitable pigment, such as lampblack, titanium dioxide, etc., or a dye. We may also use an odor and a preservative. The choice of these latter is widely known as, for example, beta-naphthol and coumarin give a very nice odor. One or more of the alkyl esters of p-aminohydroxy-benzoic acid may be added to prevent molding of the capsules, although their use is not essential, etc. These latter may be suspended in alcohol, so as to permit their more rapid incorporation into the mixture.

By way of illustration, and not limitation, certain specific examples are given herewith of the use of our materials in specific formulations.

EXAMPLE 1

A mixture was prepared by agitating together 68 kg. of chilled distilled water, 120 grams of red dye F. D. and C. No. 2, 72 grams of yellow dye F. D. and C. No. 5 and 240 grams of blue dye F. D. and C. No. 1. Thereto was added a mixture prepared by mixing 1200 grams of lampblack and 8 kg. of chilled glycerin and additionally a mixture resulting from disolving in 3.5 liters of ethyl alcohol 250 grams of beta naphthol, 192 grams of methyl-p-amino-hydroxybenzoate and 48 grams of propyl-p-hydroxyaminobenzoate and 72 grams of coumarin. 62,200 grams of chilled glycerin was then added and 10 kg. of chilled water used for rinsing the various containers was also added. 10 kilograms of acetamide were added. The combined liquids were agitated until thoroughly mixed and cooled to approximately 3° C. Thereto was added 111,800 grams of 200 bloom gelatin, also chilled to approximately 3° C. and the mixture worked in a rotating arm mixer until a sponge was formed, which took approximately 20 minutes. The sponge was homogeneous and the gelatin was uniformly hydrated. The sponge was stored in containers in a chilled room until ready for use. At the time of use, the sponge was placed on a low pressure steam coil in a jacketed stainless steel kettle which had a screen below the steam coil, so that only the liquid formed from the melting of the mixture was permitted to pass. The kettle was jacketed so as to maintain a uniform temperature within the kettle and was air-tight. A vacuum was applied sufficient to remove the air during the melting operation until the sponge was melted. After all of the sponge had melted and flowed through the screen into the lower portion of the kettle, it was allowed to stand for 15 minutes at 15" vacuum to insure the removal of any trapped material, after which the vacuum was released and the gelatin melt was stored under a layer of oil until used. The gelatin mix was transferred from the bottom of the kettle to the casting mechanism. Capsules formed therefrom were found to be more resistant to shock, especially at low temperatures than capsules manufactured from compositions without the acetamide.

EXAMPLE 2

115.2 kilos of 200 bloom strength porkskin gelatin was barrel rolled with 1.2 kilos of crimson red pigment for approximately one-half hour. 252 grams of beta-naphthol, 192 grams of methyl-p-hydroxybenzoic acid and 48 grams of propyl-p-hydroxy-benzoic acid, 288 grams of a synthetic vanilla flavoring extract sold as "Ethovan" and 72 grams of coumarin were mixed with 2,880 grams of ethyl alcohol and the mixture stirred until the solids dissolved. 75.39 kilos of distilled water and 8.37 kilos of formamide were placed in a jacketed ribbon mixer and the agitators started. 900 grams of a water-soluble red dye were added to the mixture and permitted to dissolve therein. To this aqueous solution was added 43.2 kilos of glycerin, and the alcoholic solution of odors and stabilizer, and agitation continued until thoroughly mixed. To the homogeneous mixture was added the gelatin containing the pigment. The addition was made rapidly and the cover was immediately placed on the mixer and vacuum applied to withdraw substantially all of the air from the mixer. Agitation was continued and steam admitted to the jacket to warm up the mixture to a temperature of 56° C. The thus formed mixture was found to be homogeneous and satisfactory for immediate use in the manufacture of gelatin capsules. It was transferred from the mixer by air pressure to the casting drum hoppers.

Gelatin capsules filled with ultramarine blue were manufactured from the film cast and found to give very satisfactory capsules which would stand up at −10° C. without rupture when shipped in bottles. The ultramarine-filled capsules are useful as a laundry bluing where it is desired to measure uniform quantities of the bluing without the dyestuff contaminating the hands of the operator or dusting around the room.

Additional capsules were filled with stilbene yellow. By adding a suitable number of the capsules into a container of hot water, the capsules ruptured very quickly, released their contents and furnished a convenient and economical method of measuring out a desired quantity of the dyestuff with accuracy and without the dyestuff getting on the hands of the operator.

Additional capsules were filled with carbon tetrachloride and then encased in a gauze packet to be used as an emergency dry cleaning or spotting device. They may be filled with other materials which it is desired to have packaged in sealed, incremental units. Capsules were prepared from a film cast from a formulation prepared from mixing glycerin, water and a plasticizer, at 3° C., and adding 200 bloom gelatin thereto, with stirring. The composition was melted on a steam coil, and cast into a strip from which the capsules were manufactured. After three days' drying, the capsules were stored at −10° C. for twenty-four hours and tested for fragility, with the following results:

Formula

| Example | Parts | | | | Fragility |
|---------|-------|-------|-------|-------------|-----------|
|         | Gelatin | Glycerin | Water | Plasticizer |           |
| 3       | 48    | 18    | 34    |             | Brittle. |
| 4       | 48    | 18    | 32    | Formamide 2 | Slightly brittle. |
| 5       | 48    | 18    | 30    | Formamide 4 | Pliable. |
| 6       | 48    | 18    | 28    | Formamide 6 | Very pliable. |
| 7       | 48    | 18    | 32    | Acetamide 2 | Slightly brittle. |
| 8       | 48    | 18    | 30    | Acetamide 4 | Pliable. |
| 9       | 48    | 18    | 28    | Acetamide 6 | Very pliable. |

The films sealed satisfactorily, and gave capsules which were storage stable and as free from defects as those without the plasticizers.

As our invention we claim:

1. A soft gelatin capsule comprising a shell formed by casting a composition comprising essentially 48% gelatin, 18% glycerin, 32% water and 4% formamide and capsule contents in said shell.

2. A soft gelatin capsule comprising a shell formed by casting a composition comprising essentially 48% gelatin, 18% glycerin, 32% water and 4% acetamide and capsule contents in said shell.

3. A soft gelatin capsule comprising a shell formed by casting a composition comprising essentially gelatin 48 to 56 parts, glycerin 12 to 18 parts, water 30 to 34 parts and a plasticizer selected from the group consisting of formamide and acetamide 2 to 6 parts and capsule contents in said shell.

References Cited in the file of this patent

UNITED STATES PATENTS

| 2,101,574 | Dangelmajer | Dec. 7, 1937 |
| 2,246,915 | Dangelmajer | June 24, 1941 |
| 2,434,906 | Carlton | Jan. 27, 1948 |
| 2,461,472 | Kaszuba | Feb. 8, 1949 |
| 2,461,473 | Kaszuba | Feb. 8, 1949 |
| 2,558,065 | Tice | June 26, 1951 |

OTHER REFERENCES

Remington, Practice of Pharmacy, 9th edition (1948), pages 308, 671.